(12) United States Patent
Kasperkiewicz et al.

(10) Patent No.: US 8,098,964 B2
(45) Date of Patent: Jan. 17, 2012

(54) RAW IMAGE PROCESSING

(75) Inventors: Tomasz S.M. Kasperkiewicz, Redmond, WA (US); Richard S. Turner, Woodinville, WA (US); Steven J. White, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 1147 days.

(21) Appl. No.: 11/347,904

(22) Filed: Feb. 6, 2006

(65) Prior Publication Data

US 2007/0189603 A1    Aug. 16, 2007

(51) Int. Cl.
G06K 9/32 (2006.01)
G06F 15/00 (2006.01)
G06T 1/00 (2006.01)
G06G 5/00 (2006.01)

(52) U.S. Cl. ............ 382/300; 345/501; 345/622

(58) Field of Classification Search .......... 382/162–167, 382/298–300, 260–266; 348/272–273; 358/1.9, 358/3.23, 3.27, 525, 532; 345/289–611
See application file for complete search history.

(56) References Cited

U.S. PATENT DOCUMENTS

| | | | |
|---|---|---|---|
| 6,288,743 B1 * | 9/2001 | Lathrop | 348/231.9 |
| 6,404,918 B1 * | 6/2002 | Hel-or et al. | 382/167 |
| 7,469,059 B1 * | 12/2008 | Lefevere et al. | 382/166 |
| 7,474,337 B1 * | 1/2009 | Cooper | 348/222.1 |
| 7,480,417 B2 * | 1/2009 | Malvar | 382/244 |
| 7,502,505 B2 * | 3/2009 | Malvar et al. | 382/162 |
| 2007/0014486 A1 * | 1/2007 | Schiwietz et al. | 382/276 |

OTHER PUBLICATIONS

Lu et al, Color Filter Array Demosaicking: New Method and Performance Measures, IEEE Transactions on Image Processing, vol. 12, No. 10, October 2003.*

Váša, L.; Hanák, I.; Skala, V.: Improved Super-Resolution Method and Its Acceleration, Proceedings of EUSIPCO 2005.*

K. Sugita et al. Performance Evaluation of Programmable Graphics Hardware for Image Filtering and Stereo Matching. ACM VRST 2003, pp. 176-183, Oct. 2003.*

* cited by examiner

*Primary Examiner* — Gregory M Desire
*Assistant Examiner* — Andrae S Allison
(74) *Attorney, Agent, or Firm* — Shook, Hardy & Bacon LLP

(57) ABSTRACT

A system, a method and computer-readable media for processing raw image data with a graphics processing unit (GPU). Raw image data generated by an imaging sensor is received. A set of instructions for demosaicing the raw image data is communicated to the GPU. The GPU is enabled to demosaic the raw image data by executing the set of instructions.

9 Claims, 6 Drawing Sheets

RAW IMAGE PROCESSING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The proliferation of comparatively high-resolution digital imaging devices, such as digital still cameras, has led to the pursuit of increasingly higher-resolution photo manipulation, printing and other tools. However, in order to contain cost, many consumer-grade digital color cameras are single-sensor digital cameras. As the name implies, in a single-sensor digital camera only a single image sensor is used to capture color information for each pixel in a color image. Each image sensor, which is typically a charge-coupled device (CCD) or a complementary metal oxide semiconductor (CMOS), is part of a sensor array that together represent the pixels of a color image. Each image sensor can only generate information about a single color at a given pixel. These single color pixels are used to comprise an image in a so-called "Raw" format. The expanding digital image market has brought recognition that the raw image files generated by digital cameras and other devices represent an opportunity to extract the highest possible level of detail from the device.

A color image, however, is represented by combining three separate monochromatic images. In order to display a color image, all of the red, blue and green (RGB) color values are needed at each pixel. In an ideal (and expensive) camera system, each pixel in the sensor array would be provided with three image sensors—each one measuring a red, green or blue pixel color. In a single-sensor digital camera, however, only a single red, blue or green color value can be determined at a given pixel. In order to obtain the other two missing colors, they must be estimated or interpolated from surrounding pixels in the image. These estimation and interpolation techniques are called "demosaicing" algorithms.

The term "demosaicing" is derived from the fact that a color filter array (CFA) is used in front of the image sensors, with the CFA being arranged in a mosaic pattern. This mosaic pattern has only one color value for each of the pixels in the image. In order to obtain the full-color image, the mosaic pattern must be demosaiced. Thus, demosaicing is the process of interpolating back the raw image captured with a mosaic-pattern CFA, so that a full RGB value can be associated with every pixel.

Today, raw sensor data is converted into RGB data in two ways. The data may be demosaiced by the hardware of an image capture device (e.g., cameras and viewers). Alternatively, the raw data may be demosaiced and processed by a personal computer (PC). For example, the data may be downloaded from a camera onto a PC where it may be processed by an application or an operating system to create an image stored in a more readily processed format, such as JPEG (Joint Photographic Experts Group) or TIFF (Tagged Image File Format). Compared to the Raw format, these more readily processed formats are inferior and lead to, for example, loss in color depth and poor compressions.

Demosaicing on an image capture device and on a PC differ in at least one significant way. On-device demosaicing often requires only a fraction of a second, while the same processing can take 30 seconds or more on a PC. With the premium modern computer users place on speed and performance, the PC's demosaicing delay is unacceptable to most users, and more readily processed formats such as JPEG are more commonly used. In short, the poor speed of performance experienced when working with raw image data causes users to select the more readily processed formats, despite the superior level of detail and precision offered by raw image data.

SUMMARY

The present invention meets the above needs and overcomes one or more deficiencies in the prior art by providing systems and methods for processing raw image data with a graphics processing unit (GPU). Raw image data generated by an imaging sensor is received. A set of instructions for demosaicing the raw image data is communicated to the GPU. The GPU is enabled to demosaic the raw image data by executing the set of instructions. This demosaicing generates an output image having multiple color values per pixel (e.g., an RGB image).

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for processing digital images. It will be understood and appreciated by those of ordinary skill in the art that a "digital image," as the term is utilized herein, refers to any digital image data including a static and/or dynamic digital image (e.g., video) and that any and all combinations or variations thereof are contemplated to be within the scope of the present invention. An exemplary operating environment for the present invention is described below.

Figure 1A:
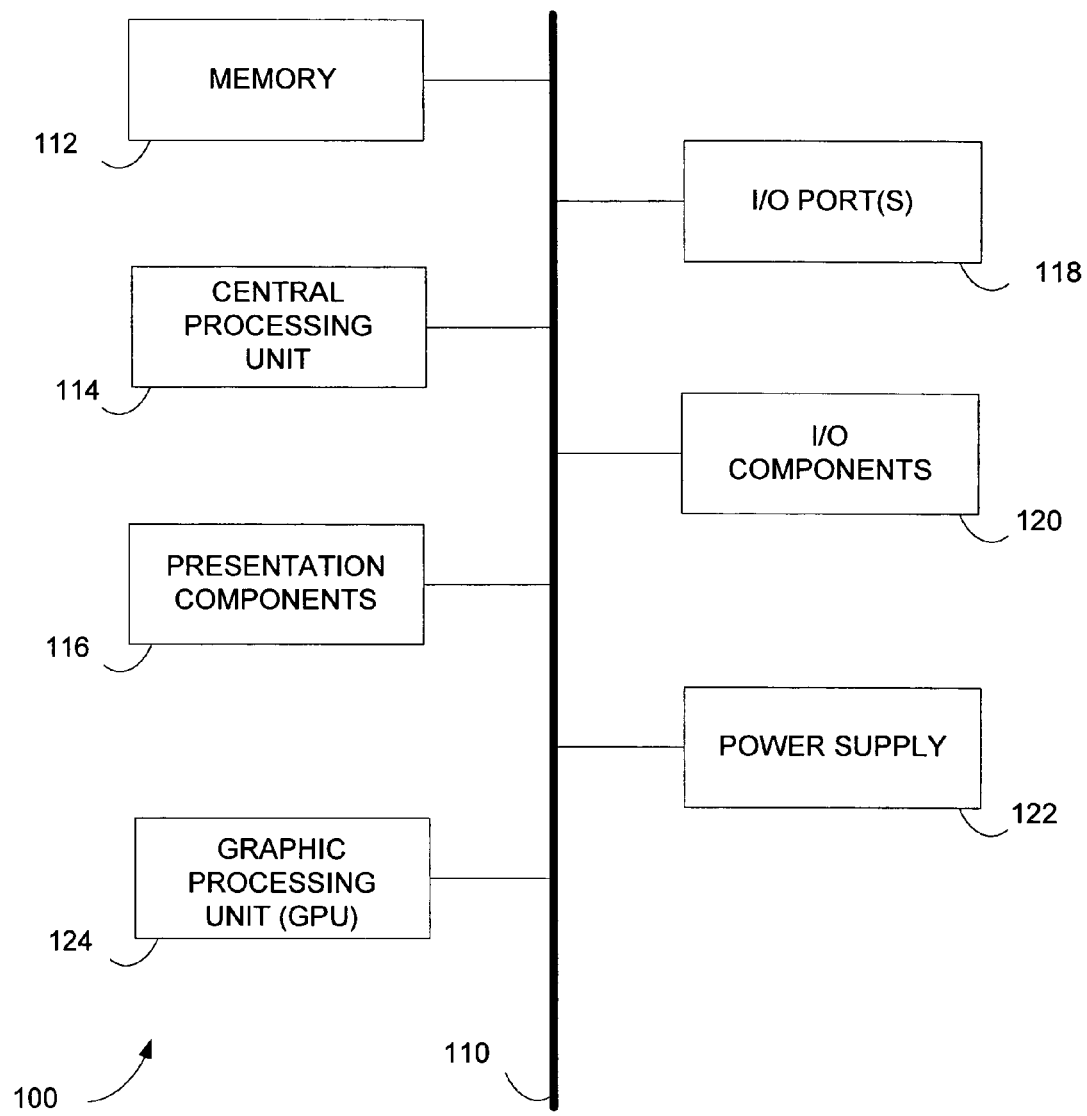
FIGS. 1A and 1B are block diagrams of an exemplary computing system environment suitable for use in implementing the present invention.

Referring initially to FIG. 1A in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, specialty computing devices (e.g., cameras and printers), etc. The invention may also be practiced in distributed computing environments where tasks are performed by remote-processing devices that are linked through a communications network.

With reference to FIG. 1A, computing device 100 includes a bus 110 that directly or indirectly couples the following elements: memory 112, a central processing unit (CPU) 114, one or more presentation components 116, input/output ports 118, input/output components 120, an illustrative power supply 122 and a graphics processing unit (GPU) 124. Bus 110 represents what may be one or more busses (such as an address bus, data bus, or combination thereof). Although the various blocks of FIG. 1A are shown with lines for the sake of clarity, in reality, delineating various components is not so clear, and metaphorically, the lines would more accurately be gray and fuzzy. For example, one may consider a presentation component such as a display device to be an I/O component. Also, CPUs and GPUs have memory. The diagram of FIG. 1A is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1A and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 1B:
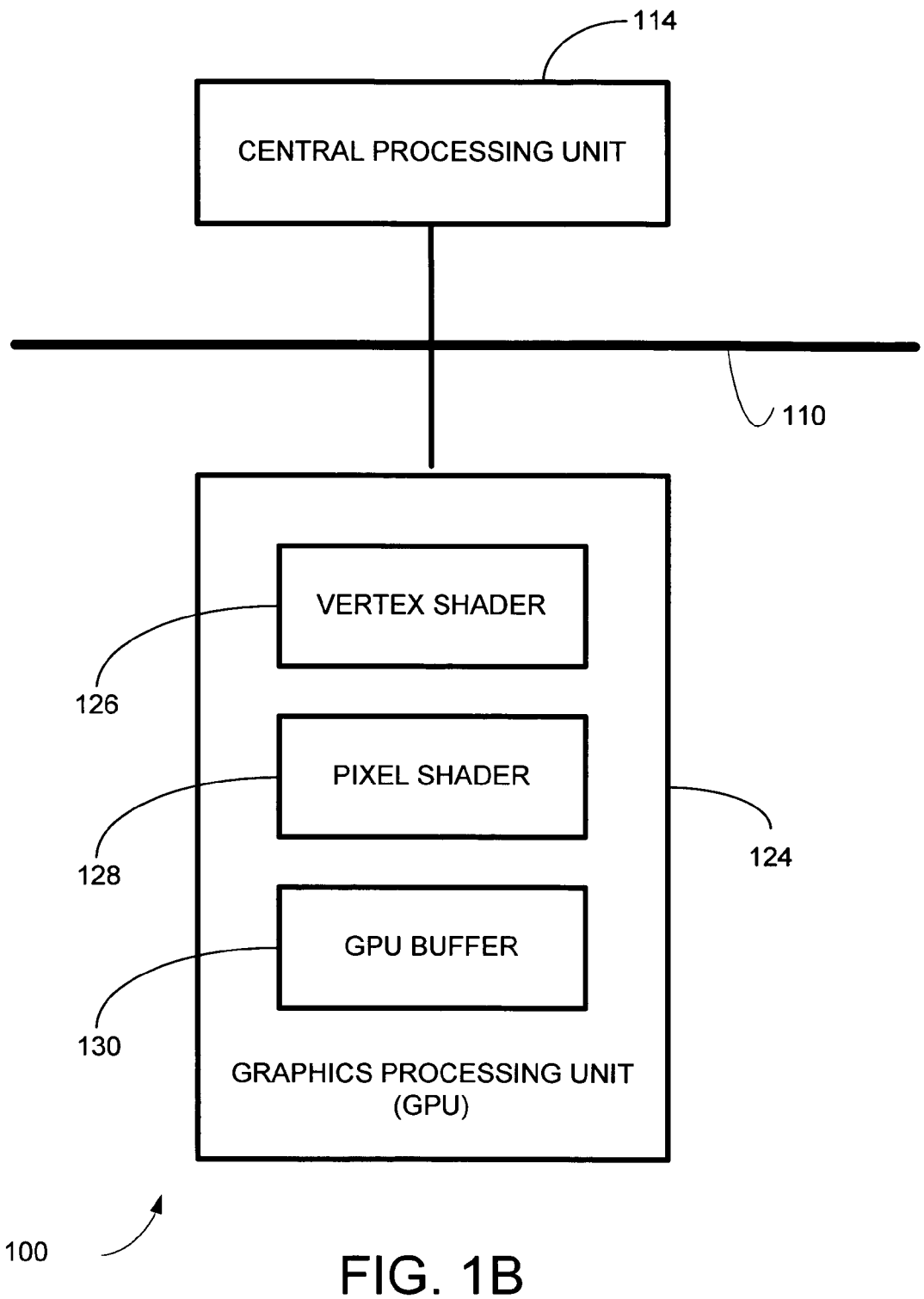

FIG. 1B details components of the computing device 100 that may be used in raw image processing. For example, the computing device 100 may be used to implement a Directed Acyclic Graph ("graph") or a graphics pipeline that processes and applies various effects and adjustments to a raw image. As known to those skilled in the art, graphs and graphics pipelines relate to a series of operations that are performed on a digital image. These graphs and pipelines are generally designed to allow efficient processing of a digital image, while taking advantage of available hardware.

To implement a graph/graphics pipeline, one or more procedural shaders on the GPU 124 are utilized. Procedural shaders are specialized processing subunits of the GPU 124 for performing specialized operations on graphics data. An example of a procedural shader is a vertex shader 126, which generally operates on vertices. For instance, the vertex shader 126 can apply computations of positions, colors and texturing coordinates to individual vertices. The vertex shader 126 may perform either fixed or programmable function computations on streams of vertices specified in the memory of the graphics pipeline. Another example of a procedural shader is a pixel shader 128. For instance, the outputs of the vertex shader 126 can be passed to the pixel shader 128, which in turn operates on each individual pixel. After a procedural shader concludes its operations, the information is placed in a GPU buffer 130, which may be presented on an attached display device or may be sent back to the host for further operation.

The GPU buffer 130 provides a storage location on the GPU 124 where an image may be stored. As various image processing operations are performed with respect to an image, the image may be accessed from the GPU buffer 130, altered and re-stored on the buffer 130. As known to those skilled in the art, the GPU buffer 130 allows the image being processed to remain on the GPU 124 while it is transformed by a graphics pipeline. As it is time-consuming to transfer an image from the GPU 124 to the memory 112, it may be preferable for an image to remain on the GPU buffer 130 until processing operations are completed.

With respect to the pixel shader 128, specialized pixel shading functionality can be achieved by downloading instructions to the pixel shader 128. For instance, downloaded instructions may enable performance of a demosaicing algorithm. Furthermore, the functionality of many different operations may be provided by instruction sets tailored to the pixel shader 128. For example, negating, remapping, biasing, and other functionality are extremely useful for many graphics applications. The ability to program the pixel shader 128 is advantageous for graphics operations, and specialized sets of instructions may add value by easing development and improving performance. By executing these instructions, a variety of functions can be performed by the pixel shader 128, assuming the instruction count limit and other hardware limitations of the pixel shader 128 are not exceeded.

Figure 2:
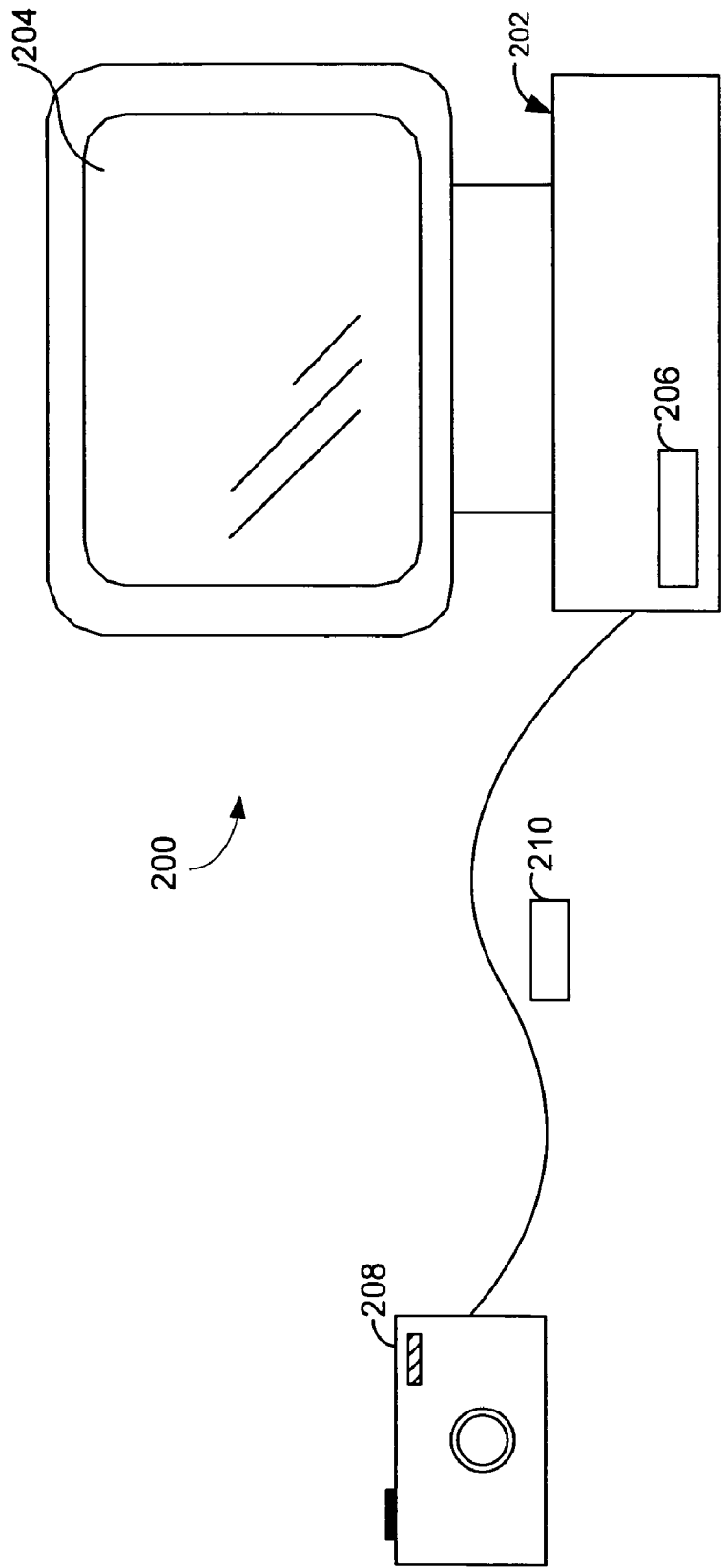
FIG. 2 illustrates an overall environment in which systems and methods for processing raw image files may operate in accordance with one embodiment of the present invention.

FIG. 2 illustrates an overall environment 200 in which a system and method for processing raw image files may operate, according to one embodiment of the invention. As illustrated in this figure, images may be captured in electronic form by an imaging device 208. The imaging device 208 may be a digital still camera, digital video camera, scanner, a camera-equipped cellular telephone or personal digital assistant (PDA), or other input device or hardware. The imaging device 208 may generate a raw image file 210 or raw image data reflecting the captured image at the lowest level of hardware activity. As will be appreciated by those skilled in the art, the "raw image data," as the terms are used herein, may be stored in a variety of formats and generally refers to the data generated by or impressed on the embedded sensors of the imaging device 208, itself. In the case of a digital camera, the sensors of the imaging device 208 may be or include electro-optical sensors, such as charged-coupled devices (CCDs) or complementary metal oxide semiconductor image sensors (CMOS).

In general, the imaging device 208 may generate the raw image file 210 and communicate that file to a client 202, such as a personal computer, for extraction, manipulation and processing. For example, the client 202 may be the computing device 100 of FIG. 1. The client 202 may present a user interface 204, such as a graphical user interface, a text or command line interface, an interface including audio input or output, or other interfaces. The imaging device 208 may communicate the raw image file 210 to the client 202, for instance to store that file in a storage location 206, which may be or include hard disk storage, optical storage or other storage or media.

Figure 3:
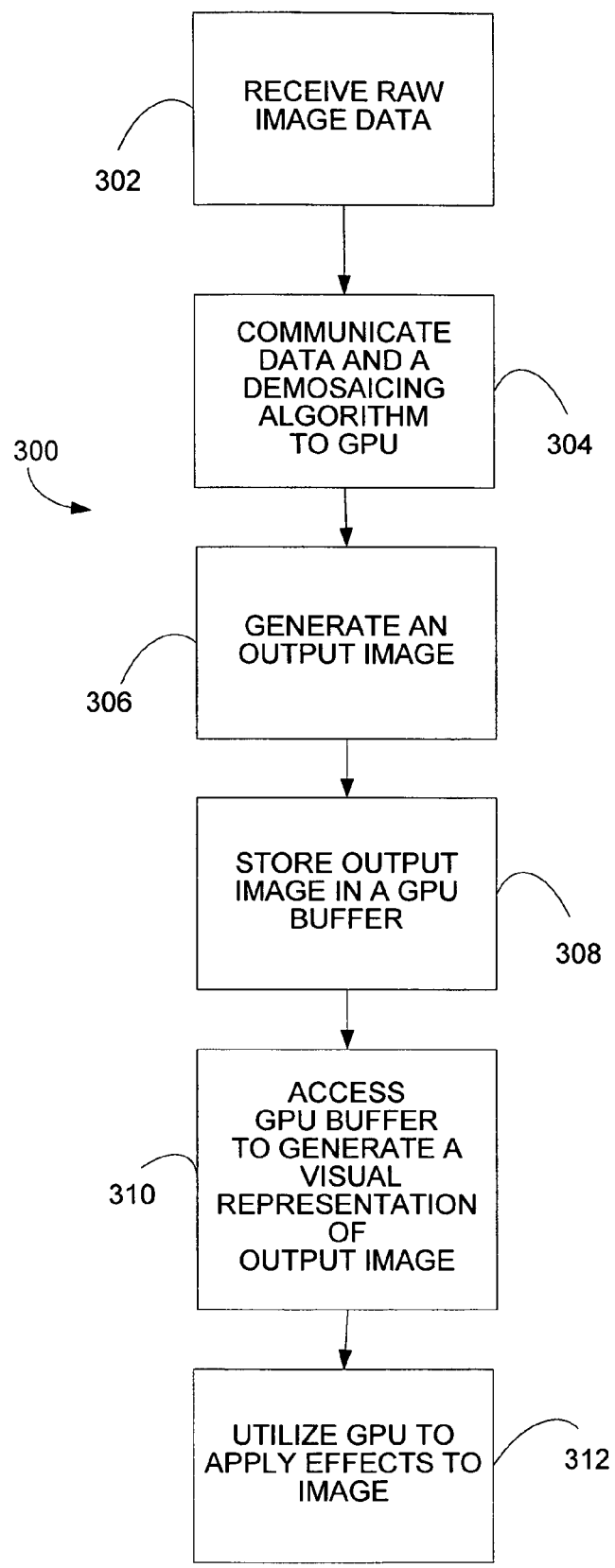
FIG. 3 illustrates a method in accordance with one embodiment of the present invention for processing raw image data with a GPU.

FIG. 3 illustrates a method 300 for processing raw image data with a GPU. At 302, the method 300 receives raw image data generated by an image sensor. For example, a digital camera may generate the raw image data, and this data may be communicated to a PC. The raw image data may be contained in a file such as the raw image file 210 of FIG. 2. Such a file may be generated by any number of devices, including a digital still camera, a digital video camera and a camera-equipped cellular telephone.

At 304, the method 300 communicates a set of instructions for demosaicing the raw image data to a GPU. For example, the instructions may be downloaded to a pixel shader. As previously discussed, a pixel shader may receive and execute a set of instructions with respect to a digital image. The pixel shader may then generate an RGB image, pixel-by-pixel, in accordance with the demosaicing instructions.

There are numerous demosaicing algorithms known in the art. One of the simplest approaches to demosaicing is bilinear interpolation. In general, bilinear interpolation uses three color planes that are independent of each other. Bilinear interpolation determines the missing color values by linearly interpolating between the nearest known values. However, bilinear techniques also generate significant artifacts (i.e., loss of sharpness caused by color bleeding at distinct edges) in the color image, which can severely degrade image quality. Some nonlinear interpolation techniques produce noticeably improved image quality, while requiring significantly more complex computational operations. Those skilled in the art will recognize that the present invention is not limited to a particular type of demosaicing algorithm, and the instructions communicated at 304 may enable implementation of any number of known demosaicing algorithms.

At 306, the method 300 enables the GPU to demosaic the raw image data to create an RGB image. In one embodiment, the set of instructions communicated at 304 may enable the pixel shader of the GPU to perform a demosaicing algorithm. GPUs have highly specialized parallel processing pipelines that allow for rapid computation of RGB pixel values. The method 300 may use this specialized hardware to demosaic the raw image data. As will be appreciated by those skilled in the art, demosaicing on the GPU will be performed in a fraction of the time needed to perform the same demosaicing on a CPU.

The method 300, at 308, stores the RGB output image in a GPU buffer. The GPU buffer is a memory location on the GPU that may store images in any number of formats. Importantly, by storing the image in the GPU buffer, it remains on the GPU and eliminates the delay caused by copying the image to the system memory of the PC. Further, the image remains available for further processing by, for example, a graphics pipeline.

While the RGB image remains in the GPU buffer, it may be desirable for a user to view the image. Accordingly, at 310, the method 300 accesses the GPU buffer to enable generation of a visual representation of the RGB output image. To generate this visual representation, any number of rendering techniques known in the art may be utilized. In this manner, the need to copy the image from the GPU is eliminated, while the user is permitted to view a representation of the RGB output image.

The method 300, at 312, utilizes the GPU to apply effects to the image. For example, the user may be presented an image editor interface that provides a variety of editing controls. Using these controls, a user may select numerous image alterations to be applied to the output image.

To alter the image, the color values associated with the image's pixels must undergo a transformation operation. These transformations may be referred to as effects. An effect, as that term is utilized herein, is a basic image processing class. That is, effects are basically pixel operators that take in buffers and pixel data, manipulate the data, and output modified pixels. For instance, a sharpening effect takes in image pixels, sharpens the pixel edges and outputs an image that is sharper than the image pixels taken in. In another example, an exposure effect takes in image pixel data, adjusts the apparent overall brightness of the image and outputs an image having a modified appearance. Different effects, e.g., masking, blending, rotating, and the like, may be defined to implement a variety of image processing algorithms.

To apply various effects, a GPU may be used to implement a graph or graphics pipeline. Utilizing the GPU, pixel data may be transformed in a variety of ways at an accelerated pace (i.e., faster than the CPU could do it itself). In one embodiment, the effects pipeline dynamically modifies the image data "non-destructively." "Non-destructive editing" or "non-destructive processing" refers to editing (or processing) wherein rendering takes place beginning from unaltered originally-loaded image data. Each time a change is made, the alteration is added to the image data without altering the raw data, e.g. as records in the image metadata. Hence, the pipeline reflects the revision history (or progeny) of the image—including the underlying raw data.

Figure 4:
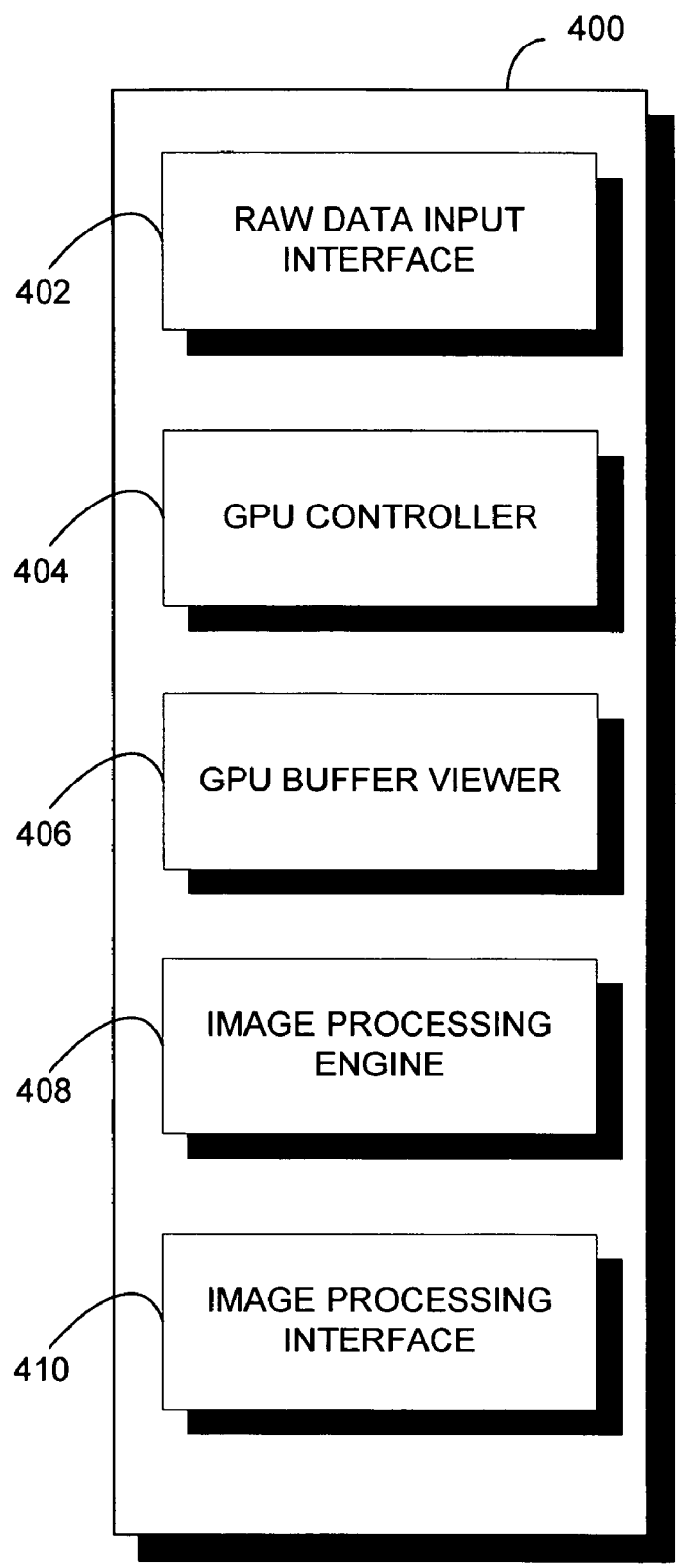
FIG. 4 is a schematic diagram illustrating a system for processing raw image data with a GPU in accordance with one embodiment of the present invention.

FIG. 4 illustrates a system 400 for processing raw image data with a GPU. The system 400 includes a raw data input interface 402. The raw data input interface 402 may be configured to receive raw image data generated by an imaging sensor. The raw data input interface 402 may, for example, receive a file such as the raw image file 210 of FIG. 2. Such a file may be generated by any number of devices. In one embodiment, a camera configured to communicate the raw data to the raw data input interface 402 generates the raw image data.

A GPU controller 404 is also included in the system 400. The GPU controller 404 may be configured to communicate instructions for demosaicing the raw image data to a GPU. For example, the instructions may be loaded onto the GPU's programmable pixel shader. Any number of demosaicing algorithms may be acceptable for the GPU to implement in accordance with the communicated instructions. Techniques for such control of a GPU are known in the art. In one embodiment, once the raw image data has been converted into an RGB image, the output RGB image is stored in a buffer residing on the GPU. In one embodiment, the output image may be stored into a processed file format by using an image file encoder (e.g., a codec). This embodiment may enable fast batch processing of Raw images, with the final result being a set of processed image files.

The system 400 further includes a GPU buffer viewer 406 configured to access the GPU buffer. While it may be time-consuming to copy an image from the GPU buffer to the memory of a computer system, generating a visual representation of the image may be accomplished relatively quickly. Accordingly, the GPU buffer viewer 406 may access the GPU buffer without copying the image data from the GPU. By accessing the image in the buffer, the GPU buffer viewer 406 may generate a view of the image for rendering to a user. Those skilled in the art will appreciate that a variety of rendering techniques exist in the art for generating such a view.

The system 400 also includes an image processing engine 408 and an image processing interface 410. As will be appreciated by those skilled in the art, a variety of alterations may be made to an image by a GPU. For example, any number of effects may be applied to an image. To edit an image, the image processing engine 408 may access the image in the GPU buffer, apply desire effects and then re-store the processed image on the buffer. In this manner, the image remains on the GPU while it is altered by the image processing engine 408. As part of the editing process, the image processing interface 410 may display to the user a representation of the image, such as a view provided by the GPU buffer viewer 406. The image processing interface 410 may also display controls related to editing the image. For example, the user may select effects to be applied to the image, while the image processing engine 408 applies the selected effects to the image. In one embodiment, an entire effects pipeline, starting with the raw image data, may be implemented on the GPU by the system 400. Those skilled in the art will appreciate that, because the GPU is utilized to perform each of the image processing operations, this processing will occur in substantially real-time.

Figure 5:
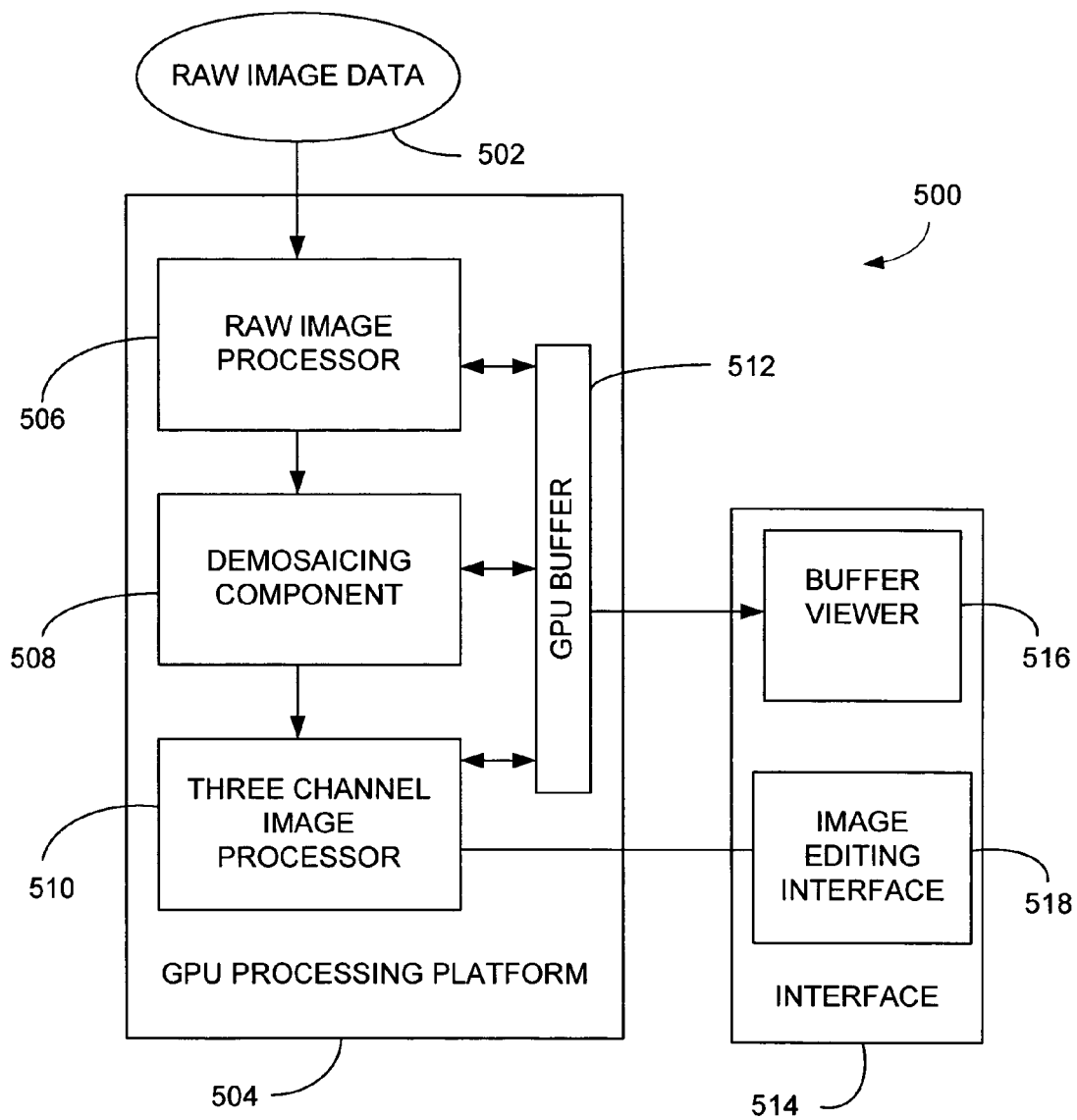
FIG. 5 is a schematic diagram illustrating a system for processing a raw image in accordance with one embodiment of the present invention.

FIG. 5 illustrates a system 500 for processing a raw image. The system includes raw image data 502, which is introduced to a GPU processing platform 504. The GPU processing platform 504 may enable performance of a variety of GPU operations with respect to the raw image data 502. For example, the raw image data 502 may be fed into a raw image processor 506. The raw image processor 506 may be configured to perform operations on the raw image data 502, such as one-channel noise reduction and 1-channel sharpening. Those skilled in the art will appreciate that raw image processing may require numerous one-channel operations, and each of these operations may be enabled by the raw image processor 506.

Once all one-channel operations have been completed, the raw data may be converted into a three-channel image (e.g., an RGB image) by a demosaicing component 508. Any number of demosaicing algorithms may be implemented on the GPU by the demosaicing component 508. As previously mentioned, the GPU is capable of demosaicing the raw data much more quickly on than a CPU, and thus, such demosaicing may be performed by the demosaicing component 508 without a noticeable delay.

After demosaicing, a three-channel image processor 510 may transform the image. Any number of GPU-performed operations may be enabled by the three-channel image processor 510. For example, curves (e.g., exposure compensation and color balance) and three-channel noise reduction/sharpening may be applied by the three-channel image processor 510. As will be appreciated by those skilled in the art, the three-channel image processor 510 may be used to implement a graph or graphics pipeline within the processing environment afforded by the GPU.

As the raw image data 502 is processed by the GPU processing platform 504, the image is stored in a GPU buffer 512. The GPU buffer 512 provides a storage location on the GPU where image data may be stored. As various image processing operations are performed, the image may be accessed from the GPU buffer 512, altered and re-stored on the buffer 512. Thus, the GPU buffer 512 allows the image to remain on the GPU while it is being transformed. In one embodiment, the GPU processing platform 504 dynamically modifies the image data non-destructively. In this case, the image stored in the GPU buffer 512 reflects the various modifications to the image.

To allow user interaction with the image processing of the GPU processing platform 504, the system 500 may include a user interface 514. The user interface 514 includes a buffer viewer 516 configured to present a visual representation of the image to the user. To generate this visual representation, the buffer viewer 516 may access the GPU buffer 512. For example, the buffer viewer 516 may be similar to the GPU buffer viewer 406 of FIG. 4. Without copying the image itself from the GPU buffer 512, buffer viewer 516 may provide a "window" into the GPU buffer 512 by enabling display of the image as it is processed on the GPU. For example, the user may be presented the RGB version of the image, as generated by the demosaicing component 508. Those skilled in the art will appreciate that the buffer viewer 516 may utilize any number of known rendering techniques to generate a view of the image for display by the user interface 514.

The user interface 514 also includes an image editing interface 518. The image editing interface 518 may be configured to receive user inputs requesting alterations to the image. For, example, the image editing interface 518 may receive an input requesting a change to the level of exposure. Any number of imaging editing controls may be provided by the image editing interface 518, and a variety of user inputs related to transforming the image may be received. The image editing interface 518 may enable transformation of the image in response to the user inputs. In one embodiment, the image editing interface 518 enables the three-channel image processor 510 to apply the transformations/effects indicated by the user inputs. As such, the requested transformation will be applied by the GPU to the image, and the transformed image will be stored in the GPU buffer 512. Subsequently, the buffer viewer 516 may access the transformed image and generate a view for display by the user interface 514.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. One or more non-transitory computer-readable media having computer-useable instructions embodied thereon to perform a method for processing raw image data with a graphics processing unit (GPU) residing on a host computer, said method comprising:

receiving, by said GPU residing on said host computer, raw image data transmitted from a device having one or more imaging sensors, wherein said device is a handheld digital camera and wherein said host computer is a general-purpose computer;

incident to said receiving, reprogramming a programmable pixel shader by communicating to said GPU a set of computer-executable instructions to be loaded onto the programmable pixel shader for demosaicing said raw image data, wherein said demosaicing includes determining interpolated intensity values representative of a plurality of colors, wherein said set of computer-executable instructions includes program code to be executed by said programmable pixel shader to accomplish said demosaicing; and generating an output image by enabling said GPU to utilize said set of instructions to demosaic at least a portion of said raw image data, wherein said output image includes a plurality of pixels having a plurality of said interpolated intensity values.

2. The media of claim 1, wherein said raw image data comprises a set of pixel representations obtained from the imaging sensor.

3. The media of claim 1, wherein said output image includes a plurality of pixels having a red color value, a green color value and a blue color value.

4. The media of claim 1, wherein said method further comprises utilizing said GPU to apply one or more effects to said output image.

5. The media of claim 1, wherein said method further comprises storing said output image in a buffer residing on said GPU.

6. The media of claim 5, wherein said method further comprises generating a visual representation of said output image for presentation to a user or for sending to a printer.

7. The media of claim 1, wherein said method further comprises saving said output image into a processed file format.

8. A system for processing raw image data with a graphics processing unit (GPU) residing on a host computer, said system comprising:

a raw data input interface residing on said host computer configured to receive raw data from a device having one or more imaging sensors, wherein said device is a handheld digital camera and wherein said host computer is a general-purpose computer;

a GPU controller configured to cause reprogramming of a programmable pixel shader by communicating to said GPU at least one set of computer-executable instructions for demosaicing said raw image data and further configured to enable said GPU to generate an output image by demosaicing said raw image data in accordance with said at least one set of instructions, wherein said output image is stored on said GPU in a GPU buffer, wherein said GPU buffer resides on said GPU, wherein said set of computer-executable instructions includes program code to be executed by said GPU to accomplish said demosaicing; and an image processing engine within said GPU configured to provide a graphics pipeline for applying one or more curve effects to said output image, wherein said one or more images are stored in said GPU buffer;

a GPU buffer viewer configured to access said GPU buffer to obtain data for generating a view of said output image for display to a user.

9. The system of claim 8, wherein said GPU controller is further configured to save said output image into a processed file format by utilizing an image file encoder.

* * * * *